M. G. C. DODWELL.
RESILIENT TIRE FOR THE WHEELS OF VEHICLES.
APPLICATION FILED JAN. 9, 1913.
1,054,516.
Patented Feb. 25, 1913.
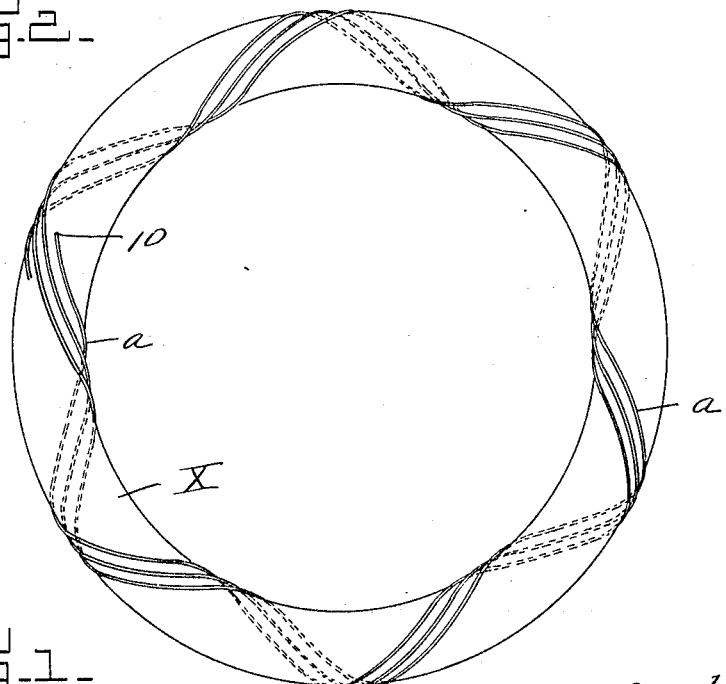
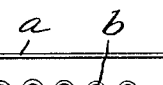
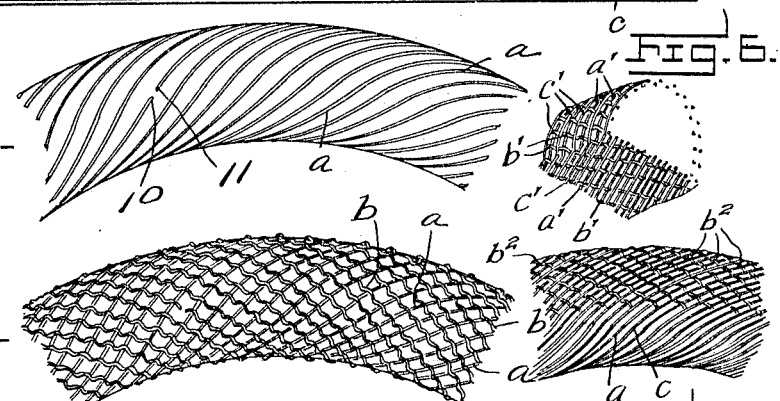
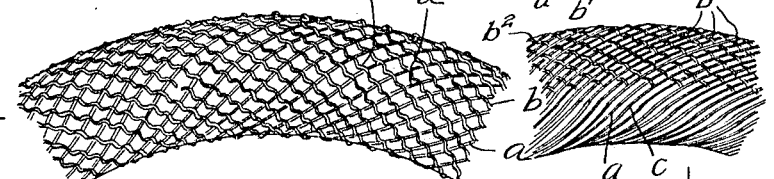
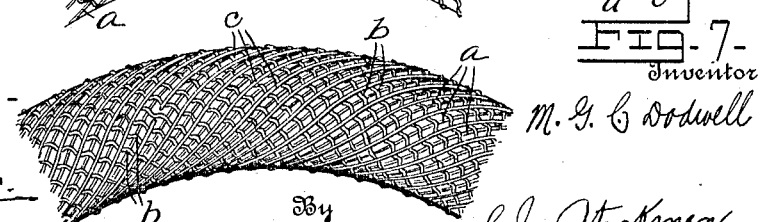

UNITED STATES PATENT OFFICE.

MALBY GEORGE CROFTON DODWELL, OF WELLINGTON, NEW ZEALAND.

RESILIENT TIRE FOR THE WHEELS OF VEHICLES.

1,054,516.  Specification of Letters Patent.  Patented Feb. 25, 1913.

Application filed January 9, 1913. Serial No. 741,048.

*To all whom it may concern:*

Be it known that I, MALBY GEORGE CROFTON DODWELL, a subject of the King of Great Britain, residing at Wellington, in the Dominion of New Zealand, have invented certain new and useful Improvements in Resilient Tires for the Wheels of Vehicles, of which the following is a specification.

This invention, generically considered, relates to resilient tires of that type comprising intersecting strands of wire, or analogous flexible and resilient material, formed into ring shape tubular in cross section.

In its specific embodiment, herein illustrated and preferred, it particularly relates to improvements in resilient tires of the kind shown in Letters Patent of the United States, granted to me October 11, 1910 and numbered 972,756.

One of the important purposes of the present invention is to provide a resilient tire formed of intersecting strands of wire or analogous material which will be strong and durable and may be economically manufactured.

Another of the important purposes of the present invention is to improve the construction of resilient tires of the kind set forth in my patent hereinbefore referred to whereby the same can be more easily manufactured without substantial loss of the benefits accruing from a tire of that kind.

These purposes, and others which need not be herein particularly referred to, are best secured from the construction illustrated in the accompanying drawings which exemplify the preferred embodiment of the present invention, but to the details of which the invention is not in all respects restricted, as changes in said details may be made and the invention otherwise embodied without departing from its spirit or the scope of the subjoined claims.

In said drawings, wherein like characters of reference denote corresponding parts in the several views:—Figure 1 is a detail view of the three elements preferably employed in a tire constructed in accordance with the present invention; Fig. 2 is an elevation showing the core upon which the tire is built up and the first wire partially wound thereon; Fig. 3 is a detail view showing the winding of the first wire complete upon the core; Fig. 4 is a like view showing the parts after the second wire has been wound; Fig. 5 is a like view illustrative of the relative disposition of the parts when the tire has been completed, the third wire being shown as wound upon the first two wires in this figure. Fig. 6 is a detail view showing a tire D-shaped in cross section; Fig. 7 is a detail view showing a view wherein the crimped member of the tire is composed of a series of short lengths placed saddlewise over the tread.

The preferred embodiment of the tire illustrated in the accompanying drawings is composed of three resilient members, such as wire, marked $a$, $b$ and $c$ respectively. The wires $a$ and $c$ are plain or non-crimped, while the wire $b$ is crimped. Each of these wires is helically coiled and they cross each other at an angle. The wire $a$ is disposed in the crests of the waves of the crimped wire $b$ and the wire $c$ is disposed in the hollows of said waves. It will be noted that the correlation of the parts is such that angular relative movement of the wires within limits defined by the shoulders or sides of the crimped wire $b$ is provided for, under the stresses applied to the tire when in use. This permits the wires to change their mutual angular positions while it precludes sidewise displacement of the wires and causes the stresses to be transmitted and distributed positively from one to another. A tire thus formed is not only capable of undergoing a limited amount of deformation and elastic recovery therefrom, but moreover is strong and durable, has a proper degree of resilience and may be economically manufactured.

The wires of which the present tire preferably is composed may be of any suitable gage and the tire when completed is of ring-form and of suitable cross-sectional shape. It is herein illustrated as being circular in cross-section, this being a very desirable shape, but it may be D-shaped in cross-section or of any other cross-sectional shape according to the rim to which it is to be applied in use.

In the construction of a tire according to the preferred embodiment of the present invention, the member $a$ is wound helically around a core X a plurality of times, the pitch of the helix preferably being such that the wire crosses the middle plane of the tire at an angle of about forty-five degrees. The winding of this member upon the core is repeated a sufficient number of times to cover the surface of the core, with an interval between adjacent windings, and the convolutions are so disposed that those of one winding will be successively arranged with respect to the convolutions of the previous winding, and the two ends 10 and 11 of the wire will have been brought together, as shown clearly in Fig. 3. These two ends of the wire are then secured together, by welding them, or in any other suitable way. As indicated in Fig. 4, I then similarly wind the wire $b$ around the outside of the wire $a$. This wire $b$ has been previously crimped to a waved form in which the distance from crest to crest of the wave is equal to the distance between the consecutive windings of the wire $a$.

The crimped wire $b$ is laid on the first coil with the crests of the waves resting on the wire $a$ of the first coil and the hollows of the waves between each two consecutive turns of the first coil, the angle at which the crimped wire $b$ is helically wound being approximately forty-five degrees to the middle plane of the tire. The crimped wire $b$ is wound a sufficient number of times completely to cover the first coil but a space may be left between consecutive convolutions of the crimped wire $b$ equal to one or more diameters of the said wire, as shown in Fig. 4. The ends of the crimped wire $b$ are then suitably united together and the third member consisting of the wire $c$ is wound around the member $b$, this wire $c$ being non-crimped and coiled to provide a plurality of windings similar to those described with reference to the member $a$, as shown in Fig. 5. The wire $c$ of the third winding is laid within the hollows of the wave formation of the crimped wire $b$ and will thereby be parallel to and interposed between consecutive windings of the first coil. The number of turns of the third wire $c$ to complete the outside coil is equal to the number of turns of the wire $a$ of the first coil.

The core X employed in the manufacture of the tire is preferably of anchor-ring construction and so constructed, or composed of such material, that it can be removed from the interior of the tire after the wires forming the latter have been wound, and, preferably, after the ends of the wires have been united.

This process of forming the tire provides a process which may be carried out in a very practical way whereby a tire having the advantages hereinbefore referred to may be economically produced from the elements herein named, but other suitable ways of building up the tire from such elements may be resorted to without departing from the spirit of the invention.

As an example of a form of tire other than circular in cross section, I have shown in Fig. 6 a tire which is D-shaped in cross-section, the members of this tire which correspond to the members $a$, $b$ and $c$ of the previously described tire being designated respectively $a'$, $b'$ and $c'$.

The second member instead of being continuous may consist of short lengths $b^2$ placed saddlewise over the first winding along the tread of the tire, as shown in Fig. 7. Moreover, the distances between consecutive windings may be made greater than those herein indicated and the pitch of the helices may vary from forty-five degrees.

Having now described the invention what I believe to be new and desire to secure by Letters Patent, is:—

1. A resilient tire, comprising a resilient metallic member having a plurality of helical windings each extending throughout the length of the tire, the convolutions of each of said windings being arranged successively with respect to those of the adjacent windings, and a second metallic member extending diagonally of the tire and intersecting the convolutions of the windings of the first member, one of said members being crimped at its intersections with the other member and said other member having its convolutions lying within said crimps, whereby the several windings are bound together for the transmission of strains.

2. A resilient tire comprising a resilient metallic member having a plurality of helical windings each extending throughout the length of the tire, the convolutions of each of said windings being arranged successively with respect to those of the adjacent windings, another helical metallic member similarly wound, each of said members being non-crimped, and a crimped metallic member arranged between the same and extending diagonally of the tire and having its crimped portion intersecting the convolutions of the two non-crimped members, the latter members having their convolutions respectively arranged in the hollows and crests of the waves of the crimped member.

3. A resilient tire for the wheel of a vehicle, comprising a helical winding of metallic wire with intervals between the convolutions, a second metallic wire crimped to a wave form and wound helically in the opposite direction upon the first wire with the depressions of the crimps between consecutive turns thereof, and a third metallic wire wound helically upon the second wire and located in the hollows of the crimps between consecutive turns of the first wire, the ends of the first and third wires being united to form endless helices.

In testimony whereof I affix my signature in presence of two witnesses.

MALBY GEORGE CROFTON DODWELL.

Witnesses:
ROBERT ARTHUR SMITH,
I. J. WORTH.

Copies of this patent may be obtained for five cents each, by addressing the "Commissioner of Patents, Washington, D. C."